United States Patent
Uyyala et al.

(10) Patent No.: US 10,580,143 B2
(45) Date of Patent: Mar. 3, 2020

(54) HIGH-FIDELITY 3D RECONSTRUCTION USING FACIAL FEATURES LOOKUP AND SKELETAL POSES IN VOXEL MODELS

(71) Applicant: INTEL CORPORATION, Santa Clara, CA (US)

(72) Inventors: Sridhar Uyyala, Hillsboro, OR (US); Ignacio J. Alvarez, Portland, OR (US); Bradley A. Jackson, Hillsboro, OR (US); Deepak S. Vembar, Portland, OR (US)

(73) Assignee: INTEL Corporation, Santa Clara, CA (US)

( * ) Notice: Subject to any disclaimer, the term of this patent is extended or adjusted under 35 U.S.C. 154(b) by 18 days.

(21) Appl. No.: 15/772,741

(22) PCT Filed: Nov. 4, 2016

(86) PCT No.: PCT/US2016/060683
§ 371 (c)(1),
(2) Date: May 1, 2018

(87) PCT Pub. No.: WO2017/079660
PCT Pub. Date: May 11, 2017

(65) Prior Publication Data
US 2018/0240244 A1    Aug. 23, 2018

Related U.S. Application Data

(60) Provisional application No. 62/250,905, filed on Nov. 4, 2015.

(51) Int. Cl.
*G06T 7/215* (2017.01)
*G06T 17/10* (2006.01)
(Continued)

(52) U.S. Cl.
CPC .......... *G06T 7/215* (2017.01); *G06K 9/00201* (2013.01); *G06K 9/00268* (2013.01);
(Continued)

(58) Field of Classification Search
CPC .......... G06K 9/00221; G06K 9/00268; G06K 9/00771; G06K 9/00624; G06K 9/00671; G06T 2207/30201
See application file for complete search history.

(56) References Cited

U.S. PATENT DOCUMENTS

2009/0059007 A1    3/2009    Wagg et al.
2009/0129630 A1    5/2009    Gloudemans et al.
(Continued)

FOREIGN PATENT DOCUMENTS

WO    2017/079660 A1    5/2017

OTHER PUBLICATIONS

International Search Report and Written Opinion received for PCT/US2016/060683, dated Feb. 28, 2017. 12 pages.
International Preliminary Report on Patentability received for PCT/US2016/060683, dated May 8, 2018. 9 pages.

*Primary Examiner* — Haixia Du
(74) *Attorney, Agent, or Firm* — Finch & Maloney PLLC

(57) ABSTRACT

Techniques for high-fidelity three-dimensional (3D) reconstruction of a dynamic scene as a set of voxels are provided. One technique includes: receiving, by a processor, image data from each of two or more spatially-separated sensors observing the scene from a corresponding two or more vantage points; generating, by the processor, the set of voxels from the image data on a frame-by-frame basis; reconstructing, by the processor, surfaces from the set of voxels to generate low-fidelity mesh data; identifying, by the processor, performers in the scene from the image data; obtaining, by the processor, high-fidelity mesh data corresponding to the identified performers; and merging, by the
(Continued)

processor, the low-fidelity mesh data with the high-fidelity mesh data to generate high-fidelity 3D output. The identifying of the performers includes: segmenting, by the processor, the image data into objects; and classifying, by the processor, those of the objects representing the performers.

17 Claims, 5 Drawing Sheets

(51) Int. Cl.
*G06K 9/00* (2006.01)
*G06T 1/20* (2006.01)
*G06T 13/40* (2011.01)
*G06T 17/20* (2006.01)
*G06K 9/62* (2006.01)

(52) U.S. Cl.
CPC ............ *G06K 9/6262* (2013.01); *G06T 1/20* (2013.01); *G06T 13/40* (2013.01); *G06T 17/10* (2013.01); *G06T 17/20* (2013.01); *G06K 2209/40* (2013.01)

(56) References Cited

U.S. PATENT DOCUMENTS

| | | |
|---|---|---|
| 2009/0167843 A1 | 7/2009 | Izzat et al. |
| 2009/0315978 A1 | 12/2009 | Wurmlin et al. |
| 2015/0178988 A1 | 6/2015 | Montserrat Mora et al. |
| 2016/0026870 A1* | 1/2016 | Wexler ................ H04N 5/2257 382/103 |

* cited by examiner

HIGH-FIDELITY 3D RECONSTRUCTION USING FACIAL FEATURES LOOKUP AND SKELETAL POSES IN VOXEL MODELS

CROSS-REFERENCE TO RELATED APPLICATIONS

This application claims the benefit of U.S. Provisional Application No. 62/250,905, filed on Nov. 4, 2015, the entire content of which is herein incorporated by reference.

BACKGROUND

With the advent of virtual or augmented reality technologies (e.g., real-time immersive virtual reality or teleportation), there is a large demand for three-dimensional (3D) content creation and streaming to users to enable immersive experiences. Providing immersive telepresence experiences for venues such as live sporting events or performances may entail constructing 3D representations of the captured spaces for broadcast or streaming. 3D representation or rendering of such large dynamic scenes, however, may provide inadequate resolution of individual performers, such as their facial features. In addition, increasing the resolution or dedicating additional camera resources to compensate may be equally prohibitive when considering the practical limitations such as memory, bandwidth, and number of cameras available to provide dynamic 3D content in real time.

DETAILED DESCRIPTION

Figure 1:
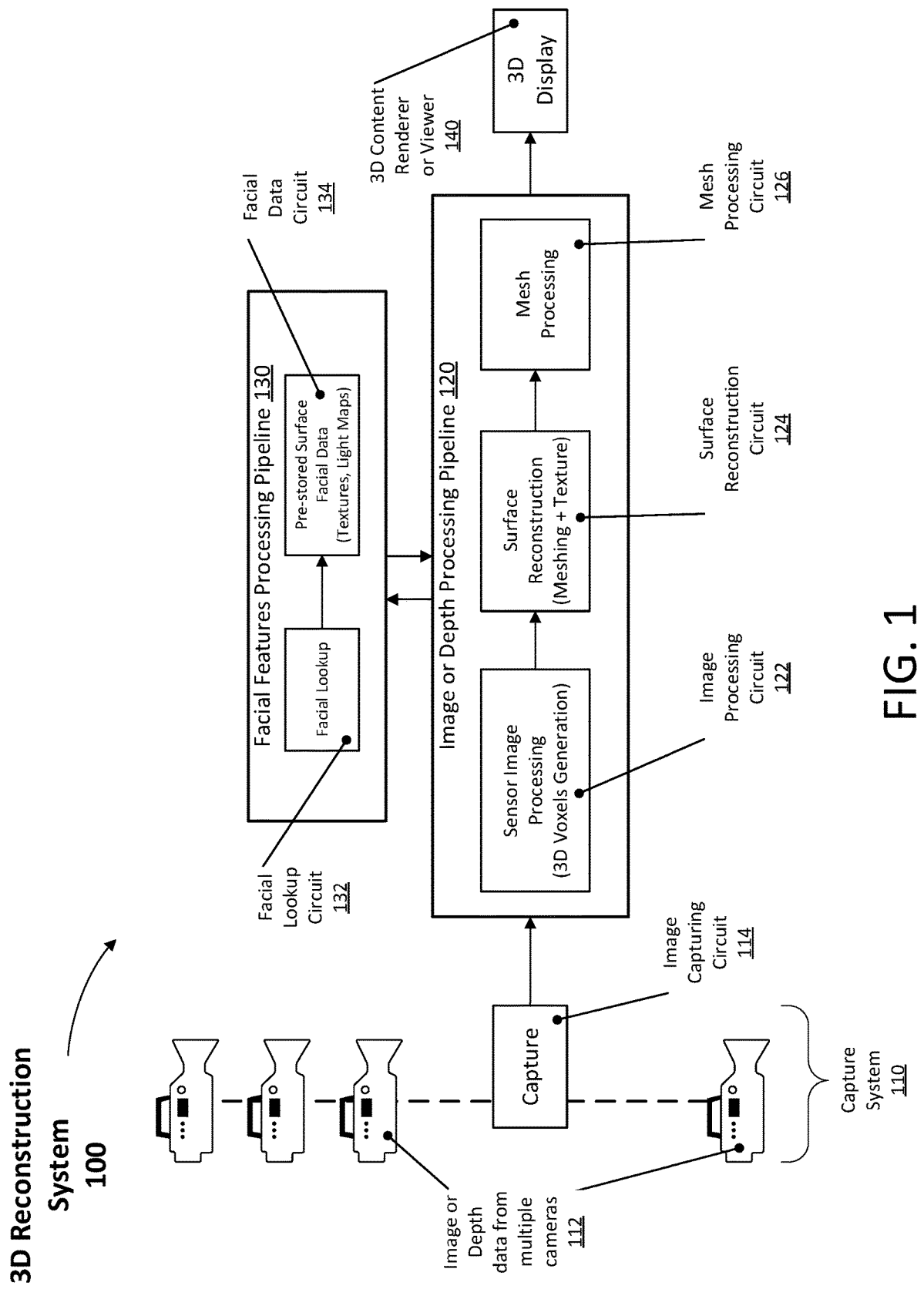
FIG. 1 illustrates an example computing system for high-fidelity 3D reconstruction using facial features lookup and skeletal poses in voxel models, according to an embodiment of the present disclosure.

Further to the issues discussed above, possible techniques that capture live sporting events include surrounding the event with cameras (e.g., roughly uniformly spaced) to construct a 3D representation of the captured space from their overlapping coverage. This enables free view (or free viewpoint) video to be constructed and provide for a very engaging experience to users watching the broadcast. An operator or (more ideally) the user can navigate and zoom into the volumetric content and obtain a novel view of the content from any virtual camera angle. The fidelity of the 3D volume recreated depends on factors such as the number of cameras used for capturing the action, their placement in the stadium, and the camera properties. For example, real-time 3D reconstruction based on video sources in other possible techniques is limited to the defined resolution of the capture elements and the deployed system of cameras. While this may be sufficient for gross details of the scene, fine details like facial features of the people in the scene are reconstructed at lower resolution due to factors such as the camera placement or the resolution of the capture. To capture fine details, other possible techniques have to include more high resolution cameras, focus on the players dynamically, or increase the resolution of the reconstructed voxels, each of which increases the cost (e.g., greater number of or more complex cameras), computation, or time needed to reconstruct the frame. Capturing and streaming of high-resolution facial features is expensive in terms of the number of cameras that would need to be focused for facial details and the voxel representations of such features. This leads to diminished visual experience for such events, at a time when 1080p (e.g., Full HD or 1080 horizontal lines of vertical resolution) and 4K (e.g., roughly 4000 pixels of horizontal resolution) broadcasts are becoming common. Other possible 3D reconstruction techniques can be limited to small capture spaces or making tradeoffs in the visual quality of the reconstruction and computation times.

Thus, to address the limitation of low-fidelity facial expressions captured in large space reconstruction, techniques to render high-resolution facial features are disclosed. These techniques provide for high-resolution facial features with smooth animations and without increasing the number of installed cameras or increasing the voxel data sizes for streaming. According to some embodiments of the present disclosure, object recognition of single data frames is performed, identifying people in the captured frame and merging a high-definition facial model of one or more of these people at the mesh generation stage of the 3D reconstruction. According to some embodiments, the recognizing of the people in the scene is based on 2D facial features lookup in combination with context-based user motion animations and redrawing with pre-captured or stored facial models having high resolution. Thus, rather than increasing the computational load required for processing higher camera resolutions or higher numbers of cameras, or outputting finer grained volumetric grids, according to some embodiments, pre-processed 3D facial meshes are generated a priori from publicly available data and selectively blended (e.g., using machine learning techniques) with reconstructed 3D image data to selectively produce high-resolution facial features in the 3D reconstruction.

In addition, rather than increasing cost- or resource-intensive parameters such as the number or resolution of the cameras, according to some embodiments of the present disclosure, resolution density in areas that are critical for the user experience (e.g. facial expressions) are increased by incorporating external data sets that are added in the mesh reconstruction step of the 3D reconstruction process. The mesh reconstruction step blends the pre-generated high resolution mesh with the reconstructed 3D mesh, using appropriate (e.g., machine learned) blend weights to animate the static mesh and merge the two meshes together. While this may be done on a per frame basis, in some embodiments, the merging is propagated across multiple frames. This may avoid excessive computation with each frame and only looks at matching 2D captured information to influence 3D mesh animation subsequently. The resolution of the 2D capture does not need to be at a fine-grained level—even rough captures are sufficient to provide input to the system. A system such as this could be very useful in applications such as live streaming of sporting events, e.g., soccer, capturing artistic performances that are streamed to viewers and provide for a more believable visual experience than with other techniques.

Consuming or displaying live 3D content of sports or other events (e.g., performances) provides great immersive experience if high resolution facial features and smooth actions of actors in the dynamic scene can be rendered or streamed to display in real time. However, generating high-resolution 3D content may require high resolution sensors or an increased number of sensors (such as sensors focused for facial details) in the image capturing system. This in turn may require higher computing resources for processing sensor data and increased storage size of 3D voxels representing high-resolution features. According to some embodiments of the present disclosure, user experience with 3D scene reconstruction is enhanced with improved video quality for live telecasting of events or concerts FIG. 1 illustrates an example computing system 100 for high-fidelity 3D reconstruction using facial features lookup and skeletal poses in voxel models, according to an embodiment of the present disclosure. The 3D reconstruction system 100 includes capture system 110, an image or depth processing pipeline 120 for 3D voxel generation, and 3D content renderer or viewer 140 providing immersive experiences to the user. The capture system 110 may include several cameras, depth sensors, lidar, or other imaging sensor devices 112 capturing the light, depth, or image from the dynamic scene. The captured data is collected by an image capturing circuit 114 and then sent through the image or depth processing pipeline 120. The image or depth processing pipeline 120 includes an image processing circuit 122, which generates 3D voxel content using image processing algorithms (such as volumetric fusion of 2D data from different 2D sensors). The processing pipeline 120 also includes a surface reconstruction circuit 124, which takes the 3D voxels and further processes them using surface reconstruction algorithms to generate, for example, polygon meshes or other geometries of the objects.

These reconstructions are further processed (as described below) to apply colors, textures, and light maps to generate mesh data that can render realistic 3D content (e.g., high-resolution facial features), which are merged with the other (possibly low resolution) 3D reconstructed content in a mesh processing circuit 126. The rendered (high-resolution) 3D content is sent to the 3D content renderer or viewer 140 (such as a 3D display device) for displaying to a user. For example, the display device may be a 3D display device or a 2D display device configured to display the 3D scene from a desired or particular perspective. It should be noted that while the 3D reconstruction system 100 of FIG. 1 (or any of the other disclosed systems) is described as a collection of distinct circuits and devices, the present disclosure is not limited thereto, and in other embodiments, some of the circuits or their functions may be combined or split among still further circuits.

According to some embodiments of the present disclosure, a facial features processing pipeline 130 processes concurrently with the image or depth processing pipeline 120, to render high-resolution facial features, without having to increase the number of sensors or their resolution in the capture system 110 and without having to increase the 3D voxel size in the image or depth processing pipeline 120. In some such embodiments, the facial features processing pipeline 130 augments low-resolution surface details with, for example, pre-generated or externally stored high-resolution facial features to enhance the immersive 3D content. In some such embodiments, high-resolution content is found in the facial features processing pipeline 130 by including a facial lookup circuit 132 and a facial data circuit 134.

The facial lookup circuit 132 employs facial recognition algorithms, facial lookup algorithms, or other identification algorithms (e.g., uniform or other distinctive clothing identification, preprogrammed identification, etc., facial or otherwise) to identify a particular person (e.g., performer or actor) in the scene. For example, in one embodiment, this facial lookup of actors in the scene is performed by comparing (possibly low resolution) 2D captured image data from the image capturing circuit 114 against a pre-stored database with high-resolution features of the actors. This may be accomplished with a 2D face lookup in combination with context-based user motion animation using known computer vision algorithms. In another embodiment, uniform (e.g., jersey) numbers or other identifying clothing (e.g., color, style, helmet) are used to identify the performers or actors. If there is a facial or other type of match, then the facial data circuit 134 applies pre-stored high-resolution textures, lightmaps, or high-resolution polygon details to the generated meshes identified as belonging to the particular matched faces. In some embodiments, the facial identification or association is remembered from frame-to-frame and tracked with the same set of facial meshes for the duration of the 3D reconstruction sequence featuring the corresponding actor or performer.

Figure 2:
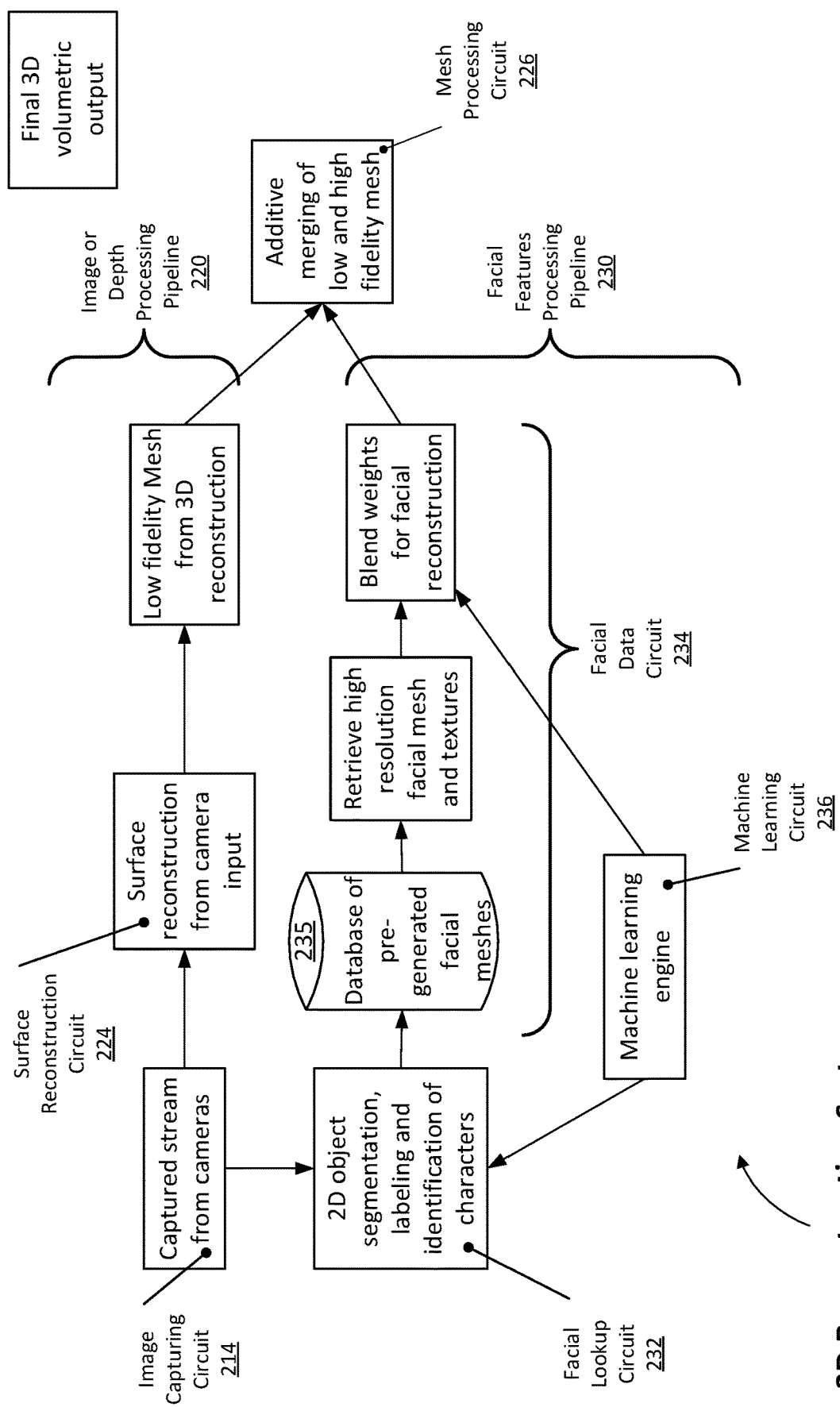
FIG. 2 illustrates a system level implementation diagram to merge reconstructed and pre-generated meshes in an example 3D reconstruction system, according to another embodiment of the present disclosure.

FIG. 2 illustrates a system level implementation diagram an example 3D reconstruction system 200 for merging reconstructed and pre-generated meshes, according to another embodiment of the present disclosure. The 3D reconstruction system 200 includes an image capturing circuit 214 for generating a captured image stream (e.g., 2D images, possibly low resolution) that is processed through an image or depth processing pipeline 220 (including surface reconstruction circuit 224) to do the 3D voxel generation and surface reconstruction for (possibly) low resolution meshes of the observed dynamic scene. The 3D reconstruction system 200 further includes a facial features processing pipeline 230 including a facial lookup circuit 232 for segmenting, classifying (or labeling), and identifying the actors or characters in the frame using the captured 2D images from the image capturing circuit 214. In some embodiments, the facial lookup circuit 232 outputs all the recognized people in the frame. In some embodiments, this facial lookup is implemented in conjunction with a machine learning engine (or machine learning circuit) 236 using current techniques in machine learning. The facial features processing pipeline 230 further includes a facial data circuit 234 including a database 235 of pre-generated facial meshes that serves as the central store of these meshes. In some embodiments, the database 235 and possibly other components of the facial features processing pipeline 230 are implemented in a cloud system.

The high-resolution facial meshes may be generated, for example, from publicly available data (images), using multi view geometry methods to obtain a 3D mesh if, for example, ranging or depth and texture information is not available. Furthermore, since these meshes are primarily for faces, in some embodiments, the meshes also contain physical anchor points to generate the facial expressions that the 2D objects module (part of facial lookup circuit 232) monitors. This allows for dynamic rendering based on the high-fidelity stored mesh models. The output of the character identification module is used to look up greater fidelity meshes from the database 235, and is retrieved by the system. In some embodiments, current frame information and the details of the face (facial expression modulation) are used to seed and weight the reconstruction of faces with appropriate blend weights for a realistic or believable facial animation. In some embodiments, these blend weights are propagated from one frame to the next to appropriately seed the weighting engine (part of machine learning circuit 236) for the next frame. The (possibly) low resolution voxel model from the 3D reconstruction (e.g., from the image or depth processing pipeline 220) is merged with the appropriate higher resolution weighted facial meshes from the facial features processing pipeline 230 at mesh processing circuit 226 (for example, using the blend weights) and the final 3D volumetric output is presented for further processing for broadcast (e.g., on a display device).

The embodiments described herein provide for improved high-fidelity 3D reconstruction using facial features lookup and skeletal poses in voxel models. The disclosed embodiments may be implemented on a broad range of computing and communication platforms, including mobile devices. These embodiments may further be implemented in hardware or software or a combination thereof.

With further reference to FIG. 1, in embodiments of the present disclosure, the cameras 112 may be any sensor (e.g., 2D, 3D, infrared, radar, lidar) capable of providing image data. The cameras 112 are spatially separated. For example, in one embodiment, the cameras 112 are positioned about or around a scene at regular (or roughly regular) intervals (or vantage points) to provide 3D coverage of the scene through their overlapping coverage areas. This coverage is sufficient to permit 3D reconstruction of the scene from any viewing point. The cameras 112 provide time-based samples of their field of view to the image capturing circuit 114. The image capturing circuit 114 collects these image data samples and provides them (e.g., in time order) to the image or depth processing pipeline 120 and the facial features processing pipeline 130.

Figure 3:
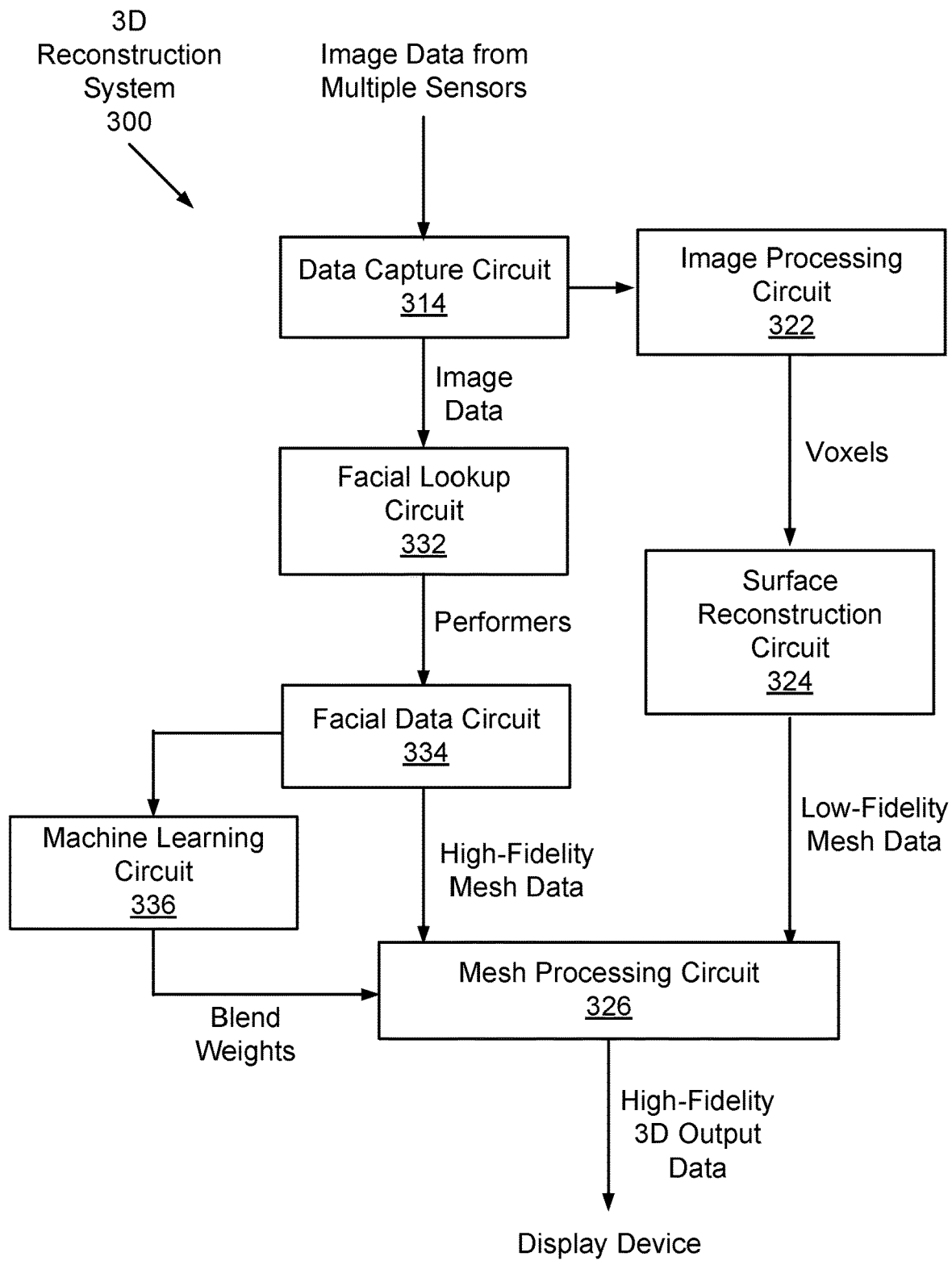
FIG. 3 is a block diagram of an example high-fidelity 3D reconstruction system, according to yet another embodiment of the present disclosure.

FIG. 3 is a block diagram of an example 3D reconstruction system 300, according to yet another embodiment of the present disclosure. The 3D reconstruction system 300 reconstructs a dynamic scene as a set of voxels and includes a data capture circuit 314, an image processing circuit 322, a surface reconstruction circuit 324, a facial lookup circuit 332, a facial data circuit 334, a machine learning circuit 336, and a mesh processing circuit 326. This embodiment is like the embodiments shown in FIG. 1 and FIG. 2 in that it includes parallel processing as shown. Thus, the previous relevant discussion is equally applicable here.

The data capture circuit 314 is configured to receive image data from each of two or more spatially-separated sensors observing the scene from a corresponding two or more vantage points. The sensors may be cameras or other visual sensing devices. The sensors are spatially separated (from different vantage points) in a sense that they are sufficiently far apart to permit 3D reconstruction of the scene by combining (or fusing) their corresponding image signals. For example, the sensors may surround or encompass the scene, and may be equidistant or at roughly uniform intervals from their nearest neighboring sensors. The image processing circuit 322 is configured to generate the set of voxels (3D representation) from the image data on a frame-by-frame basis. This may be accomplished, for example, by volumetric fusion or other techniques of fusing overlapping 2D image data into 3D data. The surface reconstruction circuit 324 is configured to reconstruct surfaces from the set of voxels to generate low-fidelity mesh data.

The facial lookup circuit 332 is configured to identify performers (e.g., actors, athletes) in the scene from the image data (e.g., by using computer vision or machine learning algorithms). The facial data circuit 334 is configured to obtain high-fidelity mesh data (e.g., facial meshes) corresponding to the identified performers. The facial meshes may be generated a priori from publicly available data and stored, for example, in a publicly available database. The mesh processing circuit 326 is configured to merge the low-fidelity mesh data with the high-fidelity mesh data to generate high-fidelity 3D output data.

In further detail, in some embodiments, the facial lookup circuit 332 is further configured to segment the image data into objects and classify (or label or otherwise categorize) those objects representing the performers. In some embodiments, the facial lookup circuit 332 is further configured to compare facial features in the image data corresponding to the performer objects against a database of facial features of possible performers. In some embodiments, the facial lookup circuit 332 is further configured to use context-based user motion animations to identify the performers. In some embodiments, for each performer of the identified performers, the facial data circuit 334 is further configured to retrieve, from a database of pre-generated high-fidelity mesh data, high-fidelity mesh data corresponding to the performer, and the machine learning circuit 336 is configured to determine blend weights to apply to the performer's high-fidelity mesh data. In some embodiments, the mesh processing circuit 326 is further configured to blend the low-fidelity mesh data corresponding to the performer with the performer's high-fidelity mesh data using the performer's blend weights. In some embodiments, the machine learning circuit 336 is further configured to propagate the blend weights for the current frame to seed the determining of the blend weights for a next frame. In some embodiments, the high-fidelity mesh data includes high-fidelity facial meshes.

Methodology

Figure 4:
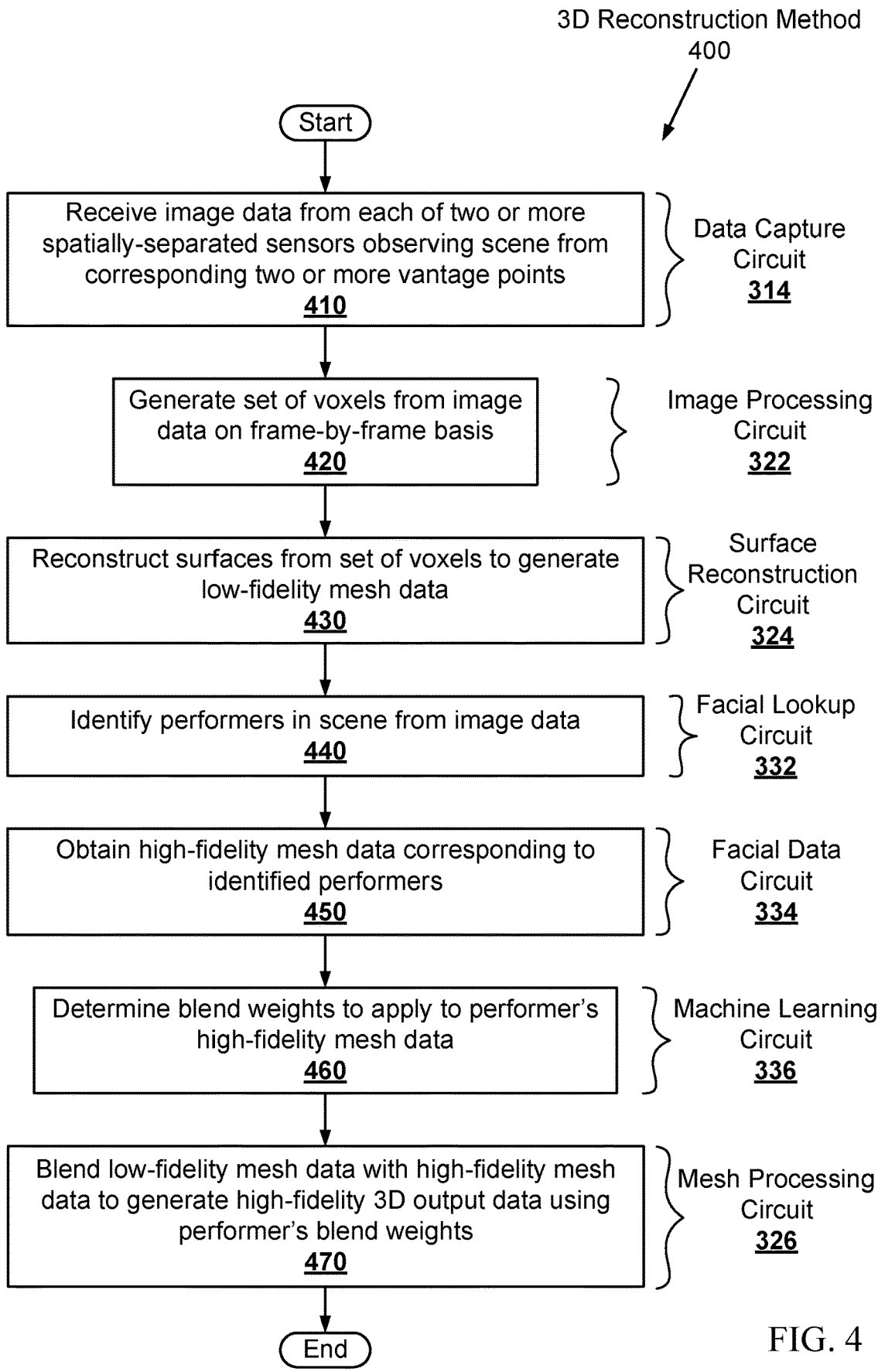
FIG. 4 is a flowchart illustrating an example method for high-fidelity 3D reconstruction, according to an embodiment of the present disclosure.

FIG. 4 is a flowchart illustrating an example method 400 for 3D reconstruction of a dynamic scene as a set of voxels, according to an embodiment of the present disclosure. As may be seen, example method 400 includes several phases and sub-processes, the sequence of which may vary from one embodiment to another. However, when considered in the aggregate, these phases and sub-processes form a process for 3D reconstruction in accordance with some of the embodiments disclosed herein. These embodiments may be implemented, for example, using one of the system architectures illustrated in FIG. 1 through FIG. 3 as described above.

However, other system architectures may be used in other embodiments, as will be apparent in light of this disclosure. To this end, the correlation of the various functions shown in FIG. 4 to the specific components illustrated in the other figures is not intended to imply any structural or use limitations. Rather, other embodiments may include, for example, varying degrees of integration where multiple functionalities are effectively performed by one system. For example, in an alternative embodiment, a single module may be used to perform all the functions of method 400. Thus, other embodiments may have fewer or more modules or sub-modules depending on the granularity of implementation. In still other embodiments, the methodology depicted may be implemented as a computer program product including one or more non-transitory machine readable mediums that when executed by one or more processors cause the methodology to be carried out. Numerous variations and alternative configurations will be apparent in light of this disclosure.

As illustrated in FIG. 4, in one embodiment, method 400 for 3D reconstruction commences by receiving, at operation 410, image data from each of two or more spatially-separated sensors observing the scene from a corresponding two or more vantage points. This may be performed, for example, by the data capture circuit 314 of FIG. 3. At operation 420, the set of voxels is generated from the image data on a frame-by-frame basis. This may be performed, for example, by the image processing circuit 322 of FIG. 3. At operation 430, surfaces are reconstructed from the set of voxels to generate low-fidelity mesh data. This operation may be performed, for example, by the surface reconstruction circuit 324 of FIG. 3.

At operation 440, performers are identified in the scene from the image data. This may include segmenting the image data into objects, classifying those objects representing the performers, comparing facial features in the image data corresponding to the performer objects against a database of facial features of possible performers, and using context-based user motion animations to identify the performers These operations may be performed, for example, by the facial lookup circuit 332 of FIG. 3. At operation 450, high-fidelity mesh data is obtained corresponding to the identified performers. This may include retrieving, from a database of pre-generated high-fidelity mesh data, high-fidelity mesh data corresponding to the performer. These operations may be performed, for example, by the facial data circuit 334 of FIG. 3. At operation 460, blend weights are determined to apply to the performer's high-fidelity mesh data. This may be performed, for example, by the machine learning circuit 336 of FIG. 3. At operation 470, the low-fidelity mesh data is blended with the high-fidelity mesh data to generate high-fidelity 3D output data using the performer's blend weights. This may be performed, for example, by the mesh processing circuit 326 of FIG. 3.

In some embodiments, the determining of the blend weights for the next frame includes propagating the blend weights for the current frame to seed the machine learning circuit for the next frame. In some embodiments, the high-fidelity mesh data includes high-fidelity facial meshes. In some embodiments, additional operations may be performed, as previously described in connection with the system.

Example System

Figure 5:
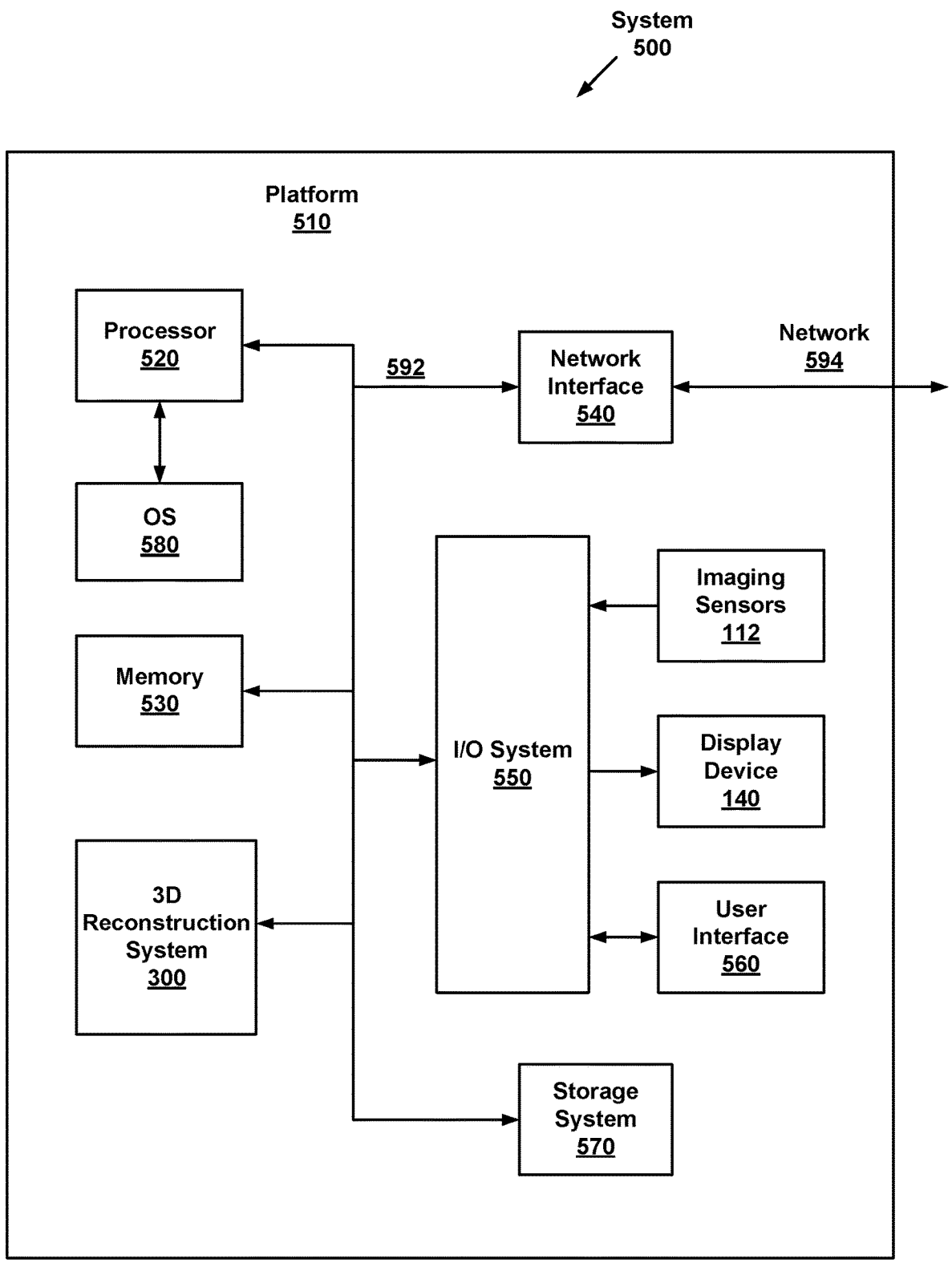
FIG. 5 illustrates an example system platform to perform high-fidelity 3D reconstruction, according to an embodiment of the present disclosure.

FIG. 5 illustrates an example system 500 to perform 3D reconstruction, according to an embodiment of the present disclosure. In some embodiments, system 500 includes a platform 510 that may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, television (TV), smart TV, TV receiver/converter or set top box, and so forth. Any combination of different devices may be used in some embodiments.

In some embodiments, platform 510 may include any combination of a processor 520, memory 530, 3D reconstruction system 300, network interface 540, input/output (I/O) system 550, imaging sensors 112, display device 140, user interface 560, and storage system 570. As may be further seen, a bus or interconnect 592 is also provided to allow for communication between the various components listed above or other components not shown. Platform 510 may be coupled to a network 594 through network interface 540 to allow for communications with other computing devices, platforms, or resources. Other componentry and functionality not reflected in the block diagram of FIG. 5 will be apparent in light of this disclosure, and it will be appreciated that other embodiments are not limited to any particular hardware configuration.

Processor 520 may be any suitable processor, and may include one or more coprocessors or controllers, such as an audio processor or a graphics processing unit, to assist in control and processing operations associated with system 500. In some embodiments, the processor 520 may be implemented as any number of processor cores. The processor (or processor cores) may be any type of processor, such as, for example, a micro-processor, an embedded processor, a digital signal processor (DSP), a graphics processor (GPU), a network processor, a field programmable gate array, or other device configured to execute code. The processors may be multithreaded cores in that they may include more than one hardware thread context (or "logical processor") per core. Processor 520 may be implemented as a complex instruction set computer (CISC) or a reduced instruction set computer (RISC) processor. In some embodiments, processor 520 may be configured as an x86 instruction set compatible processor.

In some embodiments, the disclosed techniques for 3D reconstruction may be implemented in a parallel fashion, where tasks may be distributed across multiple CPU/GPU cores or other cloud based resources to enable real-time processing from image capture to display.

Memory 530 may be implemented using any suitable type of digital storage including, for example, flash memory or random access memory (RAM). In some embodiments, the memory 530 may include various layers of memory hierarchy or memory caches. Memory 530 may be implemented as a volatile memory device such as, but not limited to, a RAM, dynamic RAM (DRAM), or static RAM (SRAM) device. Storage system 570 may be implemented as a non-volatile storage device such as, but not limited to, one or more of a hard disk drive (HDD), a solid-state drive (SSD), a universal serial bus (USB) drive, an optical disk drive, a tape drive, an internal storage device, an attached storage device, flash memory, battery backed-up synchronous DRAM (SDRAM), and a network accessible storage device. In some embodiments, storage 570 may include technology to increase the storage performance enhanced protection for valuable digital media when multiple hard drives are included.

Processor 520 may be configured to execute an Operating System (OS) 580 that may include any suitable operating system, such as Google Android (Google Inc., Mountain View, Calif.), Microsoft Windows (Microsoft Corp., Redmond, Wash.), Apple OS X (Apple Inc., Cupertino, Calif.), or Linux. As will be appreciated in light of this disclosure, the techniques provided herein may be implemented without regard to the particular operating system provided in conjunction with system 500, and therefore may also be implemented using any suitable existing or subsequently-developed platform.

Network interface circuit 540 may be any appropriate network chip or chipset which allows for wired or wireless connection between other components of computer system 500 or network 594, thereby enabling system 500 to communicate with other local or remote computing systems, servers, and cloud-based servers or resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, or Near Field Communication (NFC). Example wireless networks include, but are not limited to, wireless local area networks, wireless personal area networks, wireless metropolitan area networks, cellular networks, and satellite networks.

I/O system 550 may be configured to interface between various I/O devices and other components of computer system 500. I/O devices may include, but not be limited to, imaging sensors 112, display device 140, user interface 560, and other devices not shown such as a keyboard, mouse, microphone, and speaker, etc.

It will be appreciated that in some embodiments, the various components of the system 500 may be combined or integrated in a system-on-a-chip (SoC) architecture. In some embodiments, the components may be hardware components, firmware components, software components, or any suitable combination of hardware, firmware, or software.

3D reconstruction system 300 is configured to provide three-dimensional (3D) reconstruction of a dynamic scene as a set of voxels. These techniques include receiving image data from each of two or more spatially-separated sensors observing the scene from a corresponding two or more vantage points and fusing the image data into the set of voxels on a frame-by-frame basis. These techniques further include segmenting the image data into objects that constitute the scene and detecting which of the objects remain static from frame to frame, the remaining objects being dynamic. Further, these techniques include outputting those voxels corresponding to the dynamic objects and not to the static objects. 3D reconstruction system 300 may include any or all of the components illustrated in FIG. 1 through FIG. 3, as described above.

3D reconstruction system 300 may be implemented or otherwise used in conjunction with a variety of suitable software or hardware that is coupled to or that otherwise forms a part of platform 510. 3D reconstruction system 300 may additionally or alternatively be implemented or otherwise used in conjunction with user I/O devices that may provide information to, and receiving information and commands from, a user. These I/O devices may include devices collectively referred to as user interface 560. In some embodiments, user interface 560 may include a textual input device such as a keyboard, and a pointer-based input device such as a mouse. Other input/output devices that may be used in other embodiments include a touchscreen, a touchpad, a microphone, and a speaker. Still other input/output devices may be used in other embodiments. Further examples of user input may include gesture or motion recognition and facial tracking.

In some embodiments, 3D reconstruction system 300 may be installed local to system 500, as shown in the example embodiment of FIG. 5. In other embodiments, system 500 may be implemented in a client-server arrangement where at least some functionality associated with these circuits is provided to system 500 using an applet, such as a JavaScript applet, or another downloadable module. Such a remotely accessible module or sub-module may be provisioned in real-time, in response to a request from a client computing system for access to a given server having resources that are of interest to the user of the client computing system. In such embodiments, the server may be local to network 594 or remotely coupled to network 594 by one or more other networks or communication channels. In some cases, access to resources on a given network or computing system may require credentials such as usernames, passwords, or compliance with any other suitable security mechanism.

In various embodiments, system 500 may be implemented as a wireless system, a wired system, or a combination of both. When implemented as a wireless system, system 500 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 500 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" or "coupled" to indicate that two or more elements are in direct physical or electrical contact with each other. The term "coupled," however, may also mean that two or more elements are not in direct contact with each other, yet still cooperate or interact with each other.

The various embodiments disclosed herein may be implemented in various forms of hardware, software, firmware, or special purpose processors. For example, in one embodiment at least one non-transitory computer readable storage medium has instructions encoded thereon that, when executed by one or more processors, cause one or more of the 3D reconstruction methodologies disclosed herein to be implemented. The instructions may be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions may be provided in the form of one or more computer software applications or applets that are tangibly embodied on a memory device, and that may be executed by a computer having any suitable architecture.

In one embodiment, the system may be hosted on a given website and implemented, for example, using JavaScript or another suitable browser-based technology. For instance, in some embodiments, the system may leverage processing resources provided by a remote computer system accessible via network 594. In other embodiments, the functionalities disclosed herein may be incorporated into other software applications, such as virtual reality applications, gaming applications, entertainment applications, or other video processing applications.

The computer software applications disclosed herein may include any number of different modules, sub-modules, or other components of distinct functionality, and may provide information to, or receive information from, still other components. These modules may be used, for example, to communicate with input or output devices such as a display screen, a touch sensitive surface, a printer, or any other suitable device. Other componentry and functionality not reflected in the illustrations will be apparent in light of this disclosure, and it will be appreciated that other embodiments are not limited to any particular hardware or software configuration. Thus, in other embodiments, system 500 may include additional, fewer, or alternative subcomponents as compared to those included in the embodiment of FIG. 5.

The non-transitory computer readable medium may be any suitable medium for storing digital information, such as a hard drive, a server, a flash memory, or random access memory (RAM), or a combination of memories. In alternative embodiments, the components or modules disclosed herein may be implemented with hardware, including gate level logic such as a field-programmable gate array (FPGA), or alternatively, a purpose-built semiconductor such as an application-specific integrated circuit (ASIC). Still other embodiments may be implemented with a microcontroller having one or more input/output ports for receiving and outputting data, and one or more embedded routines for carrying out the various functionalities disclosed herein. It will be apparent that any suitable combination of hardware, software, and firmware may be used, and that other embodiments are not limited to any particular system architecture.

Some embodiments may be implemented, for example, using a machine readable medium or article which may store an instruction or a set of instructions that, if executed by a machine, may cause the machine to perform a method or operations in accordance with the embodiments. Such a machine may include, for example, any suitable processing platform, computing platform, computing device, processing device, computing system, processing system, computer, process, or the like, and may be implemented using any suitable combination of hardware and software. The machine readable medium or article may include, for example, any suitable type of memory unit, memory device, memory article, memory medium, storage device, storage article, storage medium, or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, or interpreted programming language.

Unless specifically stated otherwise, it may be appreciated that terms such as "processing," "computing," "calculating," "determining," or the like refer to the action or process of a computer or computing system, or similar electronic computing device, that manipulates or transforms data represented as physical quantities (for example, electronic) within the registers or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may include, for example, singly or in any combination, hardwired circuitry, programmable circuitry such as computer processors including one or more individual instruction processing cores, state machine circuitry, or firmware that stores instructions executed by programmable circuitry. The circuitry may include a processor or controller configured to execute one or more instructions to perform one or more operations described herein. The instructions may be embodied as, for example, an application, software, firmware, etc., configured to cause the circuitry to perform any of the operations. Software may be embodied as a software package, code, instructions, instruction sets, or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets, or data that are hard-coded (e.g., nonvolatile) in memory devices.

The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood in light of the present disclosure, however, that the embodiments may be practiced without these specific details. In other instances, well known operations, components, and circuits have not been described in detail so as not to obscure the embodiments. It may be appreciated that the specific structural and functional details disclosed herein may be representative and do not necessarily limit the scope of the embodiments. In addition, although the subject matter has been described in language specific to structural features or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a method for three-dimensional (3D) reconstruction of a dynamic scene as a set of voxels. The method includes: receiving, by a processor, image data from each of two or more spatially-separated sensors observing the scene from a corresponding two or more vantage points; generating, by the processor, the set of voxels from the image data on a frame-by-frame basis; reconstructing, by the processor, surfaces from the set of voxels to generate low-fidelity mesh data; identifying, by the processor, performers in the scene from the image data; obtaining, by the processor, high-fidelity mesh data corresponding to the identified performers; and merging, by the processor, the low-fidelity mesh data with the high-fidelity mesh data to generate high-fidelity 3D output data.

Example 2 includes the subject matter of Example 1, the identifying of the performers including: segmenting, by the processor, the image data into objects; and classifying, by the processor, those of the objects representing the performers.

Example 3 includes the subject matter of Example 2, the identifying of the performers further including comparing, by the processor, facial features in the image data corresponding to the performer objects against a database of facial features of possible performers.

Example 4 includes the subject matter of Example 3, the identifying of the performers further including using, by the processor, context-based user motion animations to identify the performers.

Example 5 includes the subject matter of any of the preceding Examples, the obtaining of the high-fidelity mesh data including, for each performer of the identified performers: retrieving, by the processor from a database of pre-generated high-fidelity mesh data, high-fidelity mesh data corresponding to the performer; and determining, by the processor using a machine learning engine, blend weights to apply to the performer's high-fidelity mesh data.

Example 6 includes the subject matter of Example 5, the merging of the low-fidelity mesh data with the high-fidelity mesh data including, for each performer of the identified performers, blending, by the processor, the low-fidelity mesh data corresponding to the performer with the performer's high-fidelity mesh data using the performer's blend weights.

Example 7 includes the subject matter of any of Examples 5 and 6, the determining of the blend weights for a next frame including propagating, by the processor, the blend weights for the current frame to seed the machine learning engine for the next frame.

Example 8 includes the subject matter of any of the preceding Examples, the high-fidelity mesh data including high-fidelity facial meshes.

Example 9 is a system for high-fidelity three-dimensional (3D) reconstruction of a dynamic scene as a set of voxels. The system includes: a data capture circuit to receive image data from each of two or more spatially-separated sensors observing the scene from a corresponding two or more vantage points; an image processing circuit to generate the set of voxels from the image data on a frame-by-frame basis; a surface reconstruction circuit to reconstruct surfaces from the set of voxels to generate low-fidelity mesh data; a facial lookup circuit to identify performers in the scene from the image data; a facial data circuit to obtain high-fidelity mesh data corresponding to the identified performers; and a mesh processing circuit to merge the low-fidelity mesh data with the high-fidelity mesh data to generate high-fidelity 3D output data.

Example 10 includes the subject matter of Example 9, the facial lookup circuit being further to: segment the image data into objects; and classify those of the objects representing the performers.

Example 11 includes the subject matter of Example 10, the facial lookup circuit being further to compare facial features in the image data corresponding to the performer objects against a database of facial features of possible performers.

Example 12 includes the subject matter of Example 11, the facial lookup circuit being further to use context-based user motion animations to identify the performers.

Example 13 includes the subject matter of any of Examples 9 through 12, further including a machine learning circuit, where for each performer of the identified performers, the facial data circuit is further to retrieve, from a database of pre-generated high-fidelity mesh data, high-fidelity mesh data corresponding to the performer, and the machine learning circuit is to determine blend weights to apply to the performer's high-fidelity mesh data.

Example 14 includes the subject matter of Example 13, the mesh processing circuit being further to blend the low-fidelity mesh data corresponding to the performer with the performer's high-fidelity mesh data using the performer's blend weights.

Example 15 includes the subject matter of any of Examples 13 and 14, the machine learning circuit being further to propagate the blend weights for the current frame to seed the determining of the blend weights for a next frame.

Example 16 includes the subject matter of any of Examples 9 through 15, the high-fidelity mesh data including high-fidelity facial meshes.

Example 17 is at least one non-transitory computer readable storage medium having instructions encoded thereon that, when executed by one or more processors, result in the following operations for high-fidelity three-dimensional (3D) reconstruction of a dynamic scene as a set of voxels being performed. The operations include: receiving image data from each of two or more spatially-separated sensors observing the scene from a corresponding two or more vantage points; generating the set of voxels from the image data on a frame-by-frame basis; reconstructing surfaces from the set of voxels to generate low-fidelity mesh data; identifying performers in the scene from the image data; obtaining high-fidelity mesh data corresponding to the identified performers; and merging the low-fidelity mesh data with the high-fidelity mesh data to generate high-fidelity 3D output data.

Example 18 includes the subject matter of Example 17, the operations for the identifying of the performers including: segmenting the image data into objects; and classifying those of the objects representing the performers.

Example 19 includes the subject matter of Example 18, the operations for the identifying of the performers further including comparing facial features in the image data corresponding to the performer objects against a database of facial features of possible performers.

Example 20 includes the subject matter of Example 19, the operations for the identifying of the performers further including using context-based user motion animations to identify the performers.

Example 21 includes the subject matter of any of Examples 17 through 20, the operations for the obtaining of the high-fidelity mesh data including, for each performer of the identified performers: retrieving, from a database of pre-generated high-fidelity mesh data, high-fidelity mesh data corresponding to the performer; and determining, using a machine learning engine, blend weights to apply to the performer's high-fidelity mesh data.

Example 22 includes the subject matter of Example 21, the operations for the merging of the low-fidelity mesh data with the high-fidelity mesh data including, for each performer of the identified performers, blending the low-fidelity mesh data corresponding to the performer with the performer's high-fidelity mesh data using the performer's blend weights.

Example 23 includes the subject matter of any of Examples 21 and 22, the operations for the determining of the blend weights for a next frame including propagating the blend weights for the current frame to seed the machine learning engine for the next frame.

Example 24 includes the subject matter of any of Examples 17 through 23, the high-fidelity mesh data including high-fidelity facial meshes.

Example 25 is a system for three-dimensional (3D) reconstruction of a dynamic scene as a set of voxels. The system includes: means for receiving image data from each of two or more spatially-separated sensors observing the scene from a corresponding two or more vantage points; means for generating the set of voxels from the image data on a frame-by-frame basis; means for reconstructing surfaces from the set of voxels to generate low-fidelity mesh data; means for identifying performers in the scene from the image data; means for obtaining high-fidelity mesh data corresponding to the identified performers; and means for merging the low-fidelity mesh data with the high-fidelity mesh data to generate high-fidelity 3D output data.

Example 26 includes the subject matter of Example 25, the means for identifying of the performers including: means for segmenting the image data into objects; and means for classifying those of the objects representing the performers.

Example 27 includes the subject matter of Example 26, the means for identifying of the performers further including means for comparing facial features in the image data corresponding to the performer objects against a database of facial features of possible performers.

Example 28 includes the subject matter of Example 27, the means for identifying of the performers further including means for using context-based user motion animations to identify the performers.

Example 29 includes the subject matter of any of Examples 25 through 28, the means for obtaining of the high-fidelity mesh data including, for each performer of the identified performers: means for retrieving, from a database of pre-generated high-fidelity mesh data, high-fidelity mesh data corresponding to the performer; and means for determining, using a machine learning engine, blend weights to apply to the performer's high-fidelity mesh data.

Example 30 includes the subject matter of Example 29, the means for merging of the low-fidelity mesh data with the high-fidelity mesh data including, for each performer of the identified performers, means for blending the low-fidelity mesh data corresponding to the performer with the performer's high-fidelity mesh data using the performer's blend weights.

Example 31 includes the subject matter of any of Examples 29 and 30, the means for determining of the blend weights for a next frame including means for propagating the blend weights for the current frame to seed the machine learning engine for the next frame.

Example 32 includes the subject matter of any of Examples 25 through 31, the high-fidelity mesh data including high-fidelity facial meshes.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood in light of the present disclosure. The present disclosure should therefore be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for high-fidelity three-dimensional (3D) reconstruction of a dynamic scene as a set of voxels, the method comprising:
   receiving, by a processor-based system, image data from each of two or more spatially-separated sensors observing the scene from a corresponding two or more vantage points;
   generating, by the processor-based system, the set of voxels from the image data on a frame-by-frame basis;
   reconstructing, by the processor-based system, surfaces from the set of voxels to generate low-fidelity mesh data;
   identifying, by the processor-based system, performers in the scene from the image data;
   obtaining, by the processor-based system, high-fidelity mesh data corresponding to the identified performers, wherein the obtaining comprises, for each of one or more performers of the identified performers,
   retrieving, from a database including pre-generated high-fidelity mesh data, high-fidelity mesh data corresponding to the performer; and
   determining, using a machine learning engine, blend weights to apply to the performer's high-fidelity mesh data; and
   merging, by the processor-based system, the low-fidelity mesh data with the high-fidelity mesh data to generate high-fidelity 3D output data using the blend weights.

2. The method of claim 1, wherein the identifying of the performers comprises:
   segmenting, by the processor-based system, the image data into objects; and
   classifying, by the processor-based system, those of the objects representing the performers.

3. The method of claim 2, wherein the identifying of the performers further comprises comparing, by the processor-based system, facial features in the image data corresponding to the performer objects against a database of facial features of possible performers.

4. The method of claim 3, wherein the identifying of the performers further comprises using, by the processor-based system, context-based user motion animations to identify the performers.

5. The method of claim 1, wherein the merging of the low-fidelity mesh data with the high-fidelity mesh data comprises, for each of the one or more performers of the identified performers, blending, by the processor-based system, the low-fidelity mesh data corresponding to the performer with the performer's high-fidelity mesh data using the performer's blend weights.

6. The method of claim 1, wherein the determining of the blend weights for a next frame comprises propagating, by the processor-based system, the blend weights for the current frame to seed the machine learning engine for the next frame.

7. The method of claim 1, wherein the high-fidelity mesh data comprises high-fidelity facial meshes.

8. A system for high-fidelity three-dimensional (3D) reconstruction of a dynamic scene as a set of voxels, the system comprising:
a data capture circuit to receive image data from each of two or more spatially-separated sensors observing the scene from a corresponding two or more vantage points;
an image processing circuit to generate the set of voxels from the image data on a frame-by-frame basis;
a surface reconstruction circuit to reconstruct surfaces from the set of voxels to generate low-fidelity mesh data;
a facial lookup circuit to identify performers in the scene from the image data;
a facial data circuit to, for each of one or more performers of the identified performers, obtain high-fidelity mesh data from a database that includes pre-generated high-fidelity mesh data, the high-fidelity mesh data corresponding to the performer;
a machine learning circuit to, for each of the one or more performers of the identified performers, determine blend weights to apply to the performer's high-fidelity mesh data and propagate the blend weights for the current frame to seed the determining of the blend weights for a next frame; and
a mesh processing circuit to merge the low-fidelity mesh data with the high-fidelity mesh data to generate high-fidelity 3D output data, wherein the merging includes blending, for each of the one or more performers, the low-fidelity mesh data corresponding to the performer with the performer's high-fidelity mesh data using the performer's blend weights.

9. The system of claim 8, wherein the facial lookup circuit is further to:
segment the image data into objects; and
classify those of the objects representing the performers.

10. The system of claim 9, wherein the facial lookup circuit is further to:

compare facial features in the image data corresponding to the performer objects against a database of facial features of possible performers; and
use context-based user motion animations to identify the performers.

11. At least one non-transitory computer readable storage medium having instructions encoded thereon that, when executed by one or more processors, result in the following operations for high-fidelity three-dimensional (3D) reconstruction of a dynamic scene as a set of voxels being performed, the operations comprising:
receiving image data from each of two or more spatially-separated sensors observing the scene from a corresponding two or more vantage points;
generating the set of voxels from the image data on a frame-by-frame basis;
reconstructing surfaces from the set of voxels to generate low-fidelity mesh data;
identifying performers in the scene from the image data;
obtaining high-fidelity mesh data corresponding to the identified performers, wherein the obtaining includes, for each of one or more performers of the identified performers,
retrieving, from a database that includes pre-generated high-fidelity mesh data, high-fidelity mesh data corresponding to the performer; and
determining, using a machine learning engine, blend weights to apply to the performer's high-fidelity mesh data; and
merging the low-fidelity mesh data with the high-fidelity mesh data to generate high-fidelity 3D output data using the blend weights.

12. The computer readable storage medium of claim 11, wherein the operations for the identifying of the performers comprise:
segmenting the image data into objects; and
classifying those of the objects representing the performers.

13. The computer readable storage medium of claim 12, wherein the operations for the identifying of the performers further comprise comparing facial features in the image data corresponding to the performer objects against a database of facial features of possible performers.

14. The computer readable storage medium of claim 13, wherein the operations for the identifying of the performers further comprise using context-based user motion animations to identify the performers.

15. The computer readable storage medium of claim 11, wherein the operations for the merging of the low-fidelity mesh data with the high-fidelity mesh data comprise, for each of the one or more performers of the identified performers, blending the low-fidelity mesh data corresponding to the performer with the performer's high-fidelity mesh data using the performer's blend weights.

16. The computer readable storage medium of claim 11, wherein the operations for the determining of the blend weights for a next frame comprise propagating the blend weights for the current frame to seed the machine learning engine for the next frame.

17. The computer readable storage medium of claim 11, wherein the high-fidelity mesh data comprises high-fidelity facial meshes.

* * * * *